United States Patent [19]

Bauer

[11] 4,111,250
[45] Sep. 5, 1978

[54] SIDEWALL PROTECTOR
[75] Inventor: John R. Bauer, North Canton, Ohio
[73] Assignee: The Goodyear Tire & Rubber Company, Akron, Ohio
[21] Appl. No.: 726,324
[22] Filed: Sep. 24, 1976
[51] Int. Cl.² .............................................. B60C 5/18
[52] U.S. Cl. ................................... 152/187; 152/179; 152/191; 305/54
[58] Field of Search ............... 152/170, 172, 173, 178, 152/179, 185, 187, 190, 191, 353 R; 305/35 R, 39, 46, 54

[56] References Cited
U.S. PATENT DOCUMENTS

| 957,413 | 5/1910 | Constantin | 152/190 |
|---|---|---|---|
| 1,009,092 | 11/1911 | Pelz | 152/173 |
| 1,444,814 | 2/1923 | Tucker | 152/179 |
| 1,503,265 | 7/1924 | Goldman | 152/179 |
| 2,518,170 | 8/1950 | Otis | 152/225 |
| 2,538,134 | 1/1951 | Trautwein | 152/221 |
| 2,653,642 | 9/1953 | Cella | 152/225 |
| 4,030,530 | 6/1977 | Curtiss | 152/179 |

FOREIGN PATENT DOCUMENTS 880,960  4/1943  France ...................... 152/178

Primary Examiner—Drayton E. Hoffman
Assistant Examiner—Carl Rowold
Attorney, Agent, or Firm—Frederick K. Lacher; Frank Pincelli

[57] ABSTRACT

A tire for off-the-road vehicles, the tire is designed for a removable tread, or a lugged metal traction band. A pair of detachable resilient shields are maintained adjacent the sidewalls of the tire to protect this critical area of the tire from damage. The radially outer edges of the shields are secured adjacent the tread and the radially inner edges have circumferentially continuous inextensible reinforcements for interlocking engagement of the inner edges with the flanges of the wheel rim.

6 Claims, 4 Drawing Figures

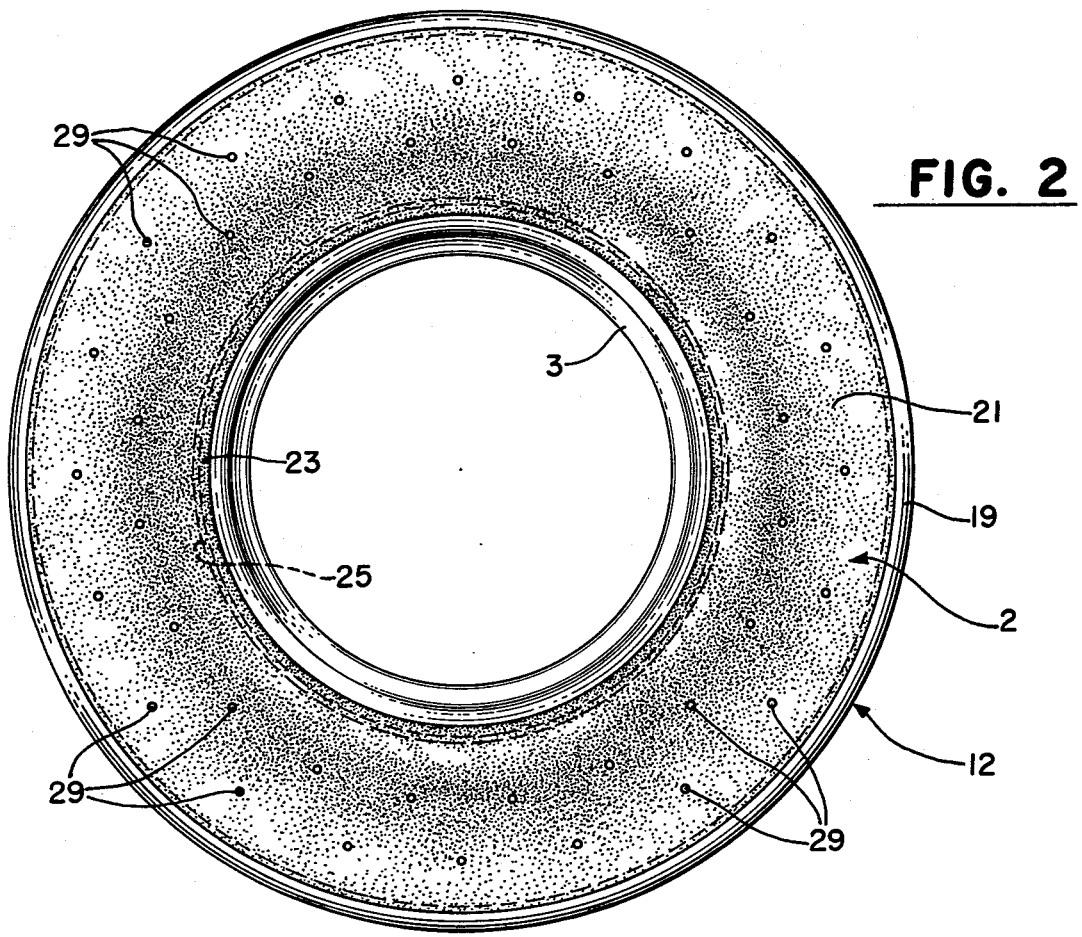
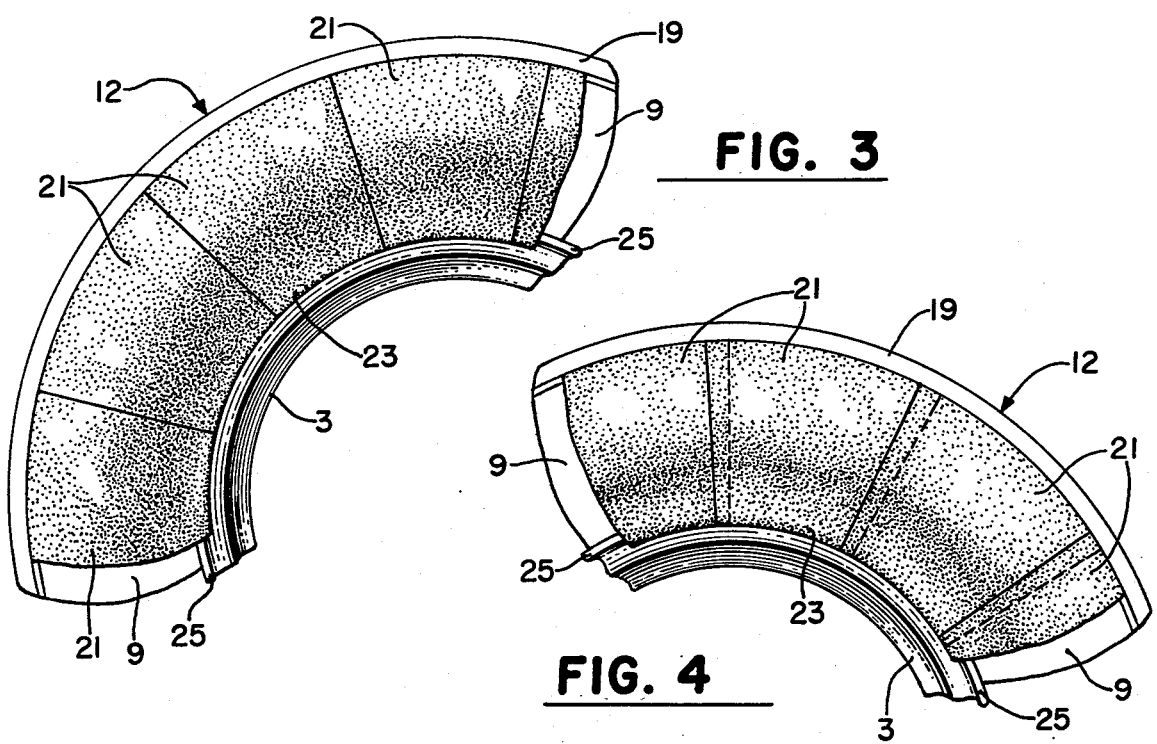

SIDEWALL PROTECTOR

BACKGROUND OF THE INVENTION

The invention is an improvement in the sidewall protection device shown and described in copending application Ser. No. 647,273, filed Jan. 5, 1976 which issued as U.S. Pat. No. 4,030,530 on June 21, 1977. The invention of this copending application is directed to a resilient shield which is fastened adjacent the tread of the tire and extends radially inwardly toward the beads of the tire to cover at least the upper sidewall regions of the tire. In some cases it has been found necessary to extend the shields to the rim flanges where they are secured to completely cover the sidewalls of the tire. The invention is directed to such a shield.

Briefly stated, the invention is in a resilient annular shield with concentrically disposed, opposing circular marginal edges. The shield is designed to completely cover a sidewall of a tire. Means are provided for securing the longer, radially outermost edge of the shield adjacent the tread and other means are supplied along the shorter, radially innermost edge of the shield for mating, interlocking engagement with the adjacent upstanding rim flange of the wheel rim on which the tire is mounted.

DESCRIPTION OF THE DRAWINGS

In the drawings:

FIG. 2 is an elevation of the shield on the tire and wheel rim shown in FIG. 1 as viewed from the left in FIG. 1.

FIG. 3 is a fragmentary elevation like FIG. 2 of a modification in which the shield is composed of a number of segments in side-by-side abutting relation.

FIG. 4 is a fragmentary elevation like FIG. 3 of still another modification in which the segments are in side-by-side, partially overlapped relation.

ENVIRONMENT OF THE INVENTION

Figure 1:
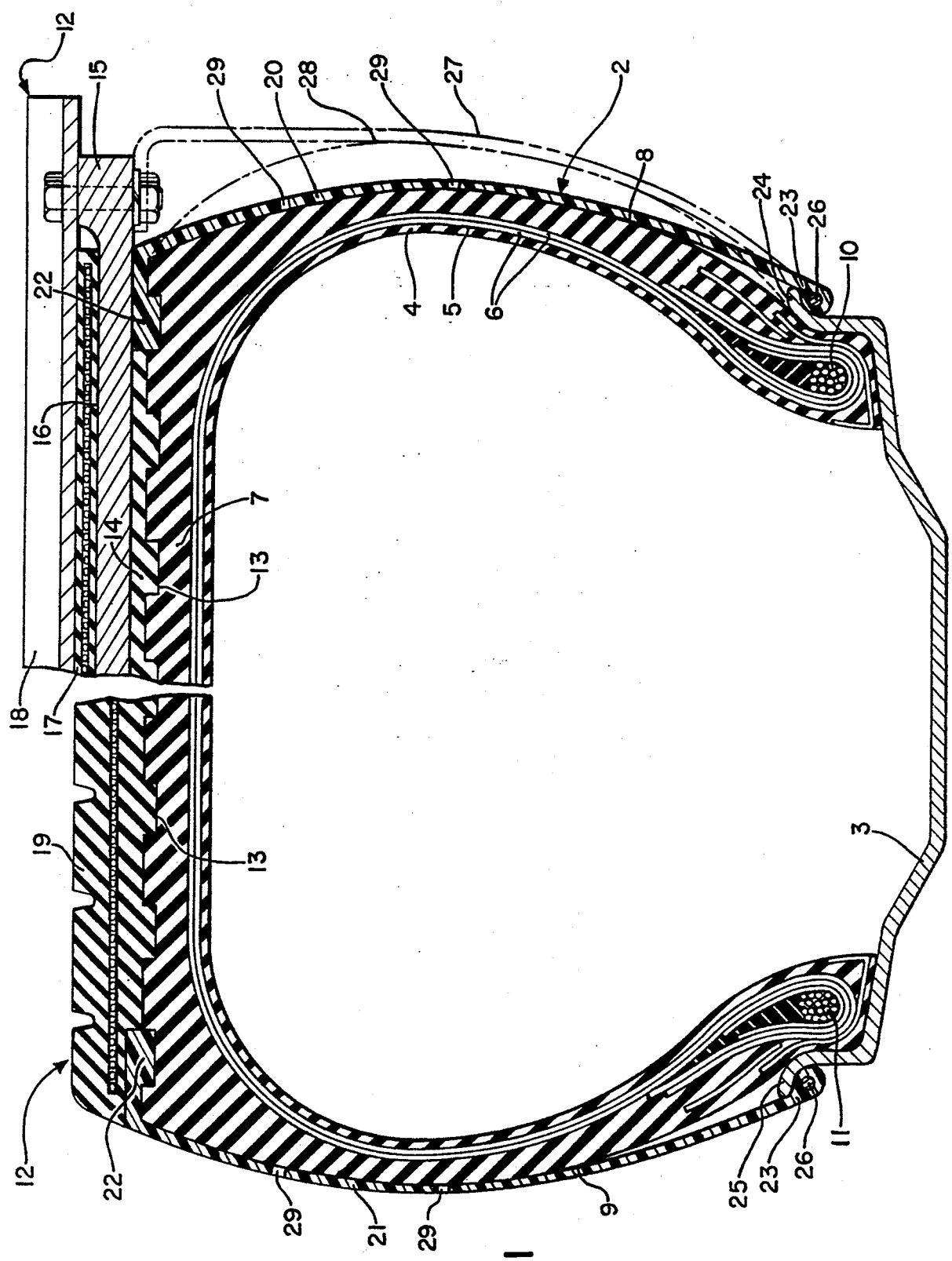
FIG. 1 is a sectional view of a tire and wheel rim showing two different embodiments of a replaceable traction element with a shield for protecting one or both of the sidewalls of the tire.

Referring to the drawings a section of a tire 2 and conventional drop center wheel rim 3 on which the tire 2 is mounted is shown. The tire 2 is a large off-the-road type tire which may be of the closed torus, or oval design typified in U.S. Pat. Nos. 1,921,772; 3,318,357; 3,392,072; 3,523,566 and British Pat. No. 1,047,921. The tire 2 essentially comprises a fluid impervious innerliner 4 which is surrounded by a carcass 5 that is composed of an appropriate number of individual plies or rubberized reinforcement cords 6, depending on the size of the tire 5. An undertread 7 and pair of sidewalls 8,9 cover the tire carcass 5 and terminate at a pair of inextensible annular metal beads 10,11. A traction element 12 is removably mounted around the outer periphery 13 of the tire 2.

The traction element 12, as seen in the right side of the drawing, comprises a continuous, rubber tread band 14 surrounded by an articulated metal ring 15 which is provided with a circumferential recess 16 for receiving a rubber belt 17. A number of metallic grouser bars 18 are bolted to the metal ring 15.

A removable tread 19, similar to those of U.S. Pat. No. 3,344,006, may be detachably mounted around the outer periphery 13 of the tire 2 as an alternative traction element 12, as seen in the left side of FIG. 1, since the invention is designed to be used with either component of a removable tread or tread band with attached grouser bars.

The Invention

A pair of annular resilient shields 20,21 are attached to the tire 2 adjacent the removable traction element 12. In this case, a generally cylindrical portion 22, disposed along the longer, radially outermost, circular marginal edge of each of the shields 20,21, is interposed between the removable traction element 12 and the outer peripheral surface of the tire 2. A number of circumferentially oriented, matingly configured ribs and grooves are formed in the adjoining surfaces of the tire 2, removable tread 19, and cylindrical portions 22 to provide a mechanical innerlock between these components. The shorter, radially innermost, circular marginal edge of each of the shields 20,21 is provided with a bulbous portion 23 for mating, interlocking engagement with the adjacent upstanding rim flanges 24,25 of the wheel rim 3. The shields 20,21 are composed of any suitable resilient, elastic material, e.g. natural or synthetic rubber, or plastic such as urethane, and may be reinforced with appropriate textile cords or wires depending on the cut resistance desired. It is desirable to produce the shields 20,21 from material which will not abrade the rubber material of the tire adjacent the shields 20,21. A reinforcement such as an inextensible textile cord or wire cable 26, is preferably circumferentially continuous and embedded in the bulbous marginal edges 23 of the resilient shields 20,21 to hold the shields firmly against the upstanding rim flanges 24,25. The resilient shields 20,21 can be a continuous annulus as shown in FIGS. 1 and 2, or formed of a number of pie-shaped segments which are shown in abutting or partially overlapped side-by-side relation in FIGS. 3 and 4; and are held together adjacent the rim flanges 24,25 by the circumferentially continuous reinforcement wire cable 26. The shields 20,21 are not secured to the sidewalls by vulcanization, rubber cement, or any other adhesive, but are maintained separate and free from them such that any stress experienced by any portion of the sidewalls 8,9 during flexing of the tire 2, will not be imparted to the shields 20,21.

The resilient shield 27, shown in dotted line on the right side of FIG. 1, is bolted to the metal ring 15. The shield 27 is preferably designed to compressibly engage the laterally outermost flexed portion 28 of the sidewall 8 which the shield 27 is designed to cover. The shields 20,21,27 may be provided with a number of small perforations or openings 29 for allowing the dissipation of heat through the shields into the ambient atmosphere.

As previously indicated, it is essential for the shields 20,21,27 to be separated from the portions of the sidewalls 8,9 covered by the shields and not cemented or vulcanized to the sidewalls 8,9 of the tire 2 as are the ornamental sidewalls typified in U.S. Pat. No. 2,334,388. A severely worn and damaged shield can be easily removed and replaced with a new one, especially when the removable traction element 12 is worn sufficiently to be replaced.

Thus, there has been provided a detachable, non-rigid or semi-rigid shield which is positioned adjacent the sidewalls of a tire for absorbing cuts and bruises normally inflicted on the tire. The shield is a separate piece of elastomeric material in addition to the normal rubber sidewall stock of the tire. A single shield can be used in cases where it is desired to protect only one of the sidewalls of the tire. Rocks, dirt and other undesirable debris are kept from between the tire and attached shield by extending the shield to the rim flanges where the free end of the shield is detachably fastened.

What is claimed is:

1. In an assembly of a wheel rim with upstanding rim flanges and a tire comprising: a tire carcass, including at least one layer of reinforcement cords; a traction element and a pair of sidewalls which at least partially surround the carcass and terminate at at least one pair of inextensible beads; the improvement comprising a non-rigid annular shield for protecting at least one of the sidewalls of the tire against punctures, the shield being separate from the sidewall and not adhered thereto such that stresses experienced by the sidewall during flexing of the tire will not be imparted to the shield, the shield being dimensioned to completely cover the sidewall between the traction element and adjacent rim flange, the shield having concentric, radially spaced inner and outer circular marginal edges, means at the radially outer marginal edge of the shield for securing the shield to the tire adjacent the traction element, and a substantially inextensible reinforcement embedded in the radially inner edge of the shield, said inner circular marginal edge being positioned adjacent the outer edge of the upstanding rim flange for mating interlocking engagement with said adjacent upstanding rim flange and mounting of the shield without stretching of said inner edge over said rim flange.

2. The improvement of claim 1, wherein the radially inner edge of the shield includes a bulbous portion which is configured to frictionally engage the adjacent outer edge of the rim flange.

3. The improvement of claim 1, wherein the reinforcement consists of the group of textile and metal cords and cables.

4. The improvement of claim 2, wherein the shield is a continuous annulus.

5. The improvement of claim 1, wherein the shield is composed of a number of segments in side-by-side, abutting relation.

6. The improvement of claim 1, wherein the shield is composed of a number of segments in side-by-side, partially overlapped relation.

* * * * *